United States Patent
Deshpande

(10) Patent No.: US 7,944,938 B2
(45) Date of Patent: *May 17, 2011

(54) SERVICE-SPECIFIC LOGICAL INTERFACES FOR PROVIDING VPN CUSTOMERS ACCESS TO EXTERNAL MULTICAST CONTENT

(75) Inventor: Prasad Deshpande, Framingham, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 86 days.

This patent is subject to a terminal disclaimer.

(21) Appl. No.: 12/465,691

(22) Filed: May 14, 2009

(65) Prior Publication Data

US 2009/0219934 A1      Sep. 3, 2009

Related U.S. Application Data

(63) Continuation of application No. 11/031,959, filed on Jan. 7, 2005, now Pat. No. 7,539,205.

(51) Int. Cl.
*H04J 3/26* (2006.01)
(52) U.S. Cl. .............. 370/432; 370/312; 370/471
(58) Field of Classification Search .......... 370/312, 370/389–394, 432, 471, 474–476
See application file for complete search history.

(56) References Cited

U.S. PATENT DOCUMENTS

| | | | |
|---|---|---|---|
| 5,557,748 A | 9/1996 | Norris | |
| 5,903,754 A | 5/1999 | Pearson | |
| 6,131,163 A | 10/2000 | Wiegel | |
| 6,195,355 B1 | 2/2001 | Demizu | |
| 6,496,479 B1 | 12/2002 | Shionozaki | |
| 6,862,274 B1 | 3/2005 | Tsao et al. | |
| 6,968,389 B1 | 11/2005 | Menditto et al. | |
| 6,990,107 B1 | 1/2006 | Rinne et al. | |
| 7,231,452 B2 | 6/2007 | Ananda et al. | |
| 7,281,058 B1 | 10/2007 | Shepherd et al. | |
| 7,298,705 B2 | 11/2007 | Shankar et al. | |
| 7,505,444 B2 | 3/2009 | Rinne et al. | |
| 7,519,010 B1 | 4/2009 | Aggarwal et al. | |
| 7,522,599 B1 | 4/2009 | Aggarwal et al. | |
| 7,522,600 B1 | 4/2009 | Aggarwal et al. | |
| 7,535,926 B1 | 5/2009 | Deshpande et al. | |
| 7,539,205 B1 * | 5/2009 | Deshpande | 370/432 |
| 7,558,219 B1 | 7/2009 | Aggarwal et al. | |
| 7,558,263 B1 | 7/2009 | Aggarwal et al. | |
| 7,564,806 B1 | 7/2009 | Aggarwal et al. | |

(Continued)

OTHER PUBLICATIONS

U.S. Patent Application entitled "Shared multicast trees for multicast virtual private networks," U.S. Appl. No. 11/213,638, filed Aug. 26, 2005.
U.S. Patent Application entitled "Aggregate multicast trees for virtual private local area network (LAN) service multicast," U.S. Appl. No. 11/213,637, filed Aug. 26, 2005.
U.S. Patent Application entitled "Auto-discovery of multicast virtual private networks," U.S. Appl. No. 11/213,640, filed Aug. 26, 2005.

(Continued)

*Primary Examiner* — Phuc Tran
(74) *Attorney, Agent, or Firm* — Shumaker & Sieffert, P.A.

(57) ABSTRACT

A network device seamlessly handles multicast traffic flow between virtual private networks (VPNs) and content providers located external to the VPNs. For example, the network device, such as a router, comprises an interface card and a forwarding component. The forwarding component maintains forwarding data for a public network and forwarding data for the virtual private network. The interface card receives a multicast packet from a virtual private network destined for a multicast content provider external to the virtual private network. When forwarding the multicast packet, the forwarding component bypasses the forwarding data for the public network and forwards the multicast packet to the multicast content provider in accordance with the forwarding data for the public network.

29 Claims, 4 Drawing Sheets

U.S. PATENT DOCUMENTS

| | | | |
|---|---|---|---|
| 7,570,604 | B1 | 8/2009 | Aggarwal et al. |
| 7,570,605 | B1 | 8/2009 | Aggarwal et al. |
| 7,590,115 | B1 | 9/2009 | Aggarwal et al. |
| 2002/0027906 | A1 | 3/2002 | Athreya et al. |
| 2003/0009548 | A1 | 1/2003 | Poynor |
| 2003/0174731 | A1 | 9/2003 | Tafazolli et al. |
| 2004/0062204 | A1 | 4/2004 | Bearden et al. |
| 2004/0088369 | A1 | 5/2004 | Yeager et al. |
| 2004/0120326 | A1 | 6/2004 | Yoon et al. |
| 2005/0099976 | A1 | 5/2005 | Yamamoto et al. |
| 2005/0120122 | A1 | 6/2005 | Farnham |
| 2005/0232228 | A1 | 10/2005 | Dharanikota et al. |
| 2005/0238050 | A1 | 10/2005 | Pung et al. |
| 2005/0265308 | A1 | 12/2005 | Barbir et al. |
| 2006/0028998 | A1 | 2/2006 | Lioy et al. |
| 2006/0088031 | A1* | 4/2006 | Nalawade ............ 370/390 |
| 2006/0182037 | A1* | 8/2006 | Chen et al. ............ 370/252 |
| 2006/0274774 | A1 | 12/2006 | Srinivasan et al. |
| 2007/0047549 | A1 | 3/2007 | Park |
| 2007/0097972 | A1 | 5/2007 | Jain et al. |

OTHER PUBLICATIONS

U.S. Patent Application entitled "Inter-autonomous system (AS) multicast virtual private networks," U.S. Appl. No. 12/423,640, filed Apr. 14, 2009.

U.S. Patent Application entitled "Transport of control and data traffic for multicast virtual private networks," U.S. Appl. No. 12/427,542, filed Apr. 21, 2009.

U.S. Patent Application entitled "Exchange of control information for virtual private local are network (LAN) service multicast," U.S. Appl. No. 12/469,075, filed May 20, 2009.

U.S Patent Application entitled "Aggregate multicast trees for multicast virtual private networks," U.S. Appl. No. 12/497,078, filed Jul. 2, 2009.

U.S. Patent Application entitled "Reliable exchange of control information for multicast virtual private networks," U.S. Appl. No. 12/497,957, filed Jul. 6, 2009.

U.S. Patent Application entitled "Multicast trees for virtual private local area network (LAN) service multicast," U.S. Appl. No. 12/497,939, filed Jul. 6, 2009.

* cited by examiner

SERVICE-SPECIFIC LOGICAL INTERFACES FOR PROVIDING VPN CUSTOMERS ACCESS TO EXTERNAL MULTICAST CONTENT

CLAIM OF PRIORITY

This application is a Continuation of U.S. application Ser. No. 11/031,959, filed Jan. 7, 2005, entitled "Service-Specific Logical Interfaces for Providing VPN Customers Access To External Multicast Content," the entire content of each of which is incorporated herein by reference.

TECHNICAL FIELD

The invention relates to computer networks and, more particularly, to multicast content delivery within computer networks.

BACKGROUND

A computer network is a collection of interconnected computing devices that exchange data and share resources. There exist a number of approaches for communicating the data between the computing devices within the network. One approach makes use of multicast addresses allowing a transmitting computing device to send data to a group of one or more recipient computing devices. The transmitting device assigns a multicast address to the data enabling each computing device of the group to receive a copy of the data.

One common usage for multicast communication is the distribution of multimedia content over a computer network, such as the Internet. For example, content providers may utilize multicast communications to distribute multimedia content to the recipient devices, also referred to as "consumers." Example content that is often distributed using multicast communications includes local area network television (LAN TV), desktop conferences, corporate broadcasts, music and video web casts, and other forms of multimedia content.

Consumers may access and switch between different multicast content provided by a content provider or multiple content providers by submitting "multicast action requests." In particular, the multicast action requests allow consumers to join and leave the various multicast groups associated with the multicast addresses. An exemplary protocol for issuing multicast action requests, such as a join request, is the Internet Group Management Protocol (IGMP).

Typically, the content providers make use of a public network, such as the Internet, to distribute the multicast content to the consumers. The consumers may be geographically distributed from the content providers and from each other, and typically access the public network by respective service providers. The service providers provide the infrastructure, such as routers, land lines and the like, that provide access to the public network.

In the context of multicast communications, the service providers mediate the interactions, i.e., multicast action requests, between the consumers and the content providers. More specifically, the service providers service the multicast action requests issued by the corresponding consumers to which they provide network access. Consequently, the service providers manage multicast groups associated with their respective consumers, and distribute multicast content received from the content providers to their respective consumers.

In some environments, the service providers may provide customers with virtual private networks (VPNs) to securely share data between two or more customer sites. For instance, a company with two different sites may securely transmit data between the two different sites via a VPN. In providing VPN services, the service providers often provide logically isolated virtual domains for the different VPNs. In particular, the service providers may utilize edge routers that provide the VPN services by maintaining logically isolated forwarding tables and other network information associated with each VPN.

Due to this logical isolation, it is often difficult for service providers to provide VPN customers with multicast content from sources external to the VPN. For example, the logically isolated forwarding tables present challenges when routing multicast action requests from the VPN customer to the multicast providers and the multicast content from the multicast providers to the VPN customers.

SUMMARY

In general, techniques are described for providing VPN customers with access to multicast content provided by content providers external to the VPN. More specifically, an edge router located within a service provider network utilizes service-specific logical interfaces to seamlessly handle multicast traffic flow from the VPN customers to the content providers, thereby allowing the VPN customers to issue multicast action requests to the content providers.

In one embodiment, a method comprises receiving a multicast packet from a virtual private network, wherein the multicast packet includes destination information for a multicast content provider external to the virtual private network. The method further comprises associating the multicast packet with a logical service interface of a network device, and forwarding the multicast packet to the multicast content provider in accordance with the logical service interface.

In another embodiment, a network device comprises an interface card and a forwarding component. The forwarding component maintains forwarding data for a public network and forwarding data for a virtual private network. The interface card receives a multicast packet from the virtual private network and destined for a multicast content provider external to the virtual private network. The forwarding component bypasses the forwarding data for the public network and forwards the multicast packet to the multicast content provider in accordance with the forwarding data for the public network.

In another embodiment, a computer-readable medium comprises instructions to cause a processor to maintain forwarding data for a public network and a virtual routing and forwarding (VRF) table having forwarding data for a virtual private network. The processor defines a logical service interface for receiving multicast packets from the virtual private network, and associates the logical service interface with the forwarding data for the public network. The processor forwards multicast packets from the virtual private network to content providers external to the virtual private network in accordance with the logical service interface and the forwarding data associated with the public network.

The techniques may provide one or more advantages. For example, the service interfaces provide seamless traffic flow from the VPN customers to the content service providers. Further, the techniques avoid the use of dedicated physical loopback interfaces or other external connections conventionally used to provide connectivity. Moreover, the techniques provide an elegant solution that often can be implemented by edge routers or other devices of a service provider with minimal configuration.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
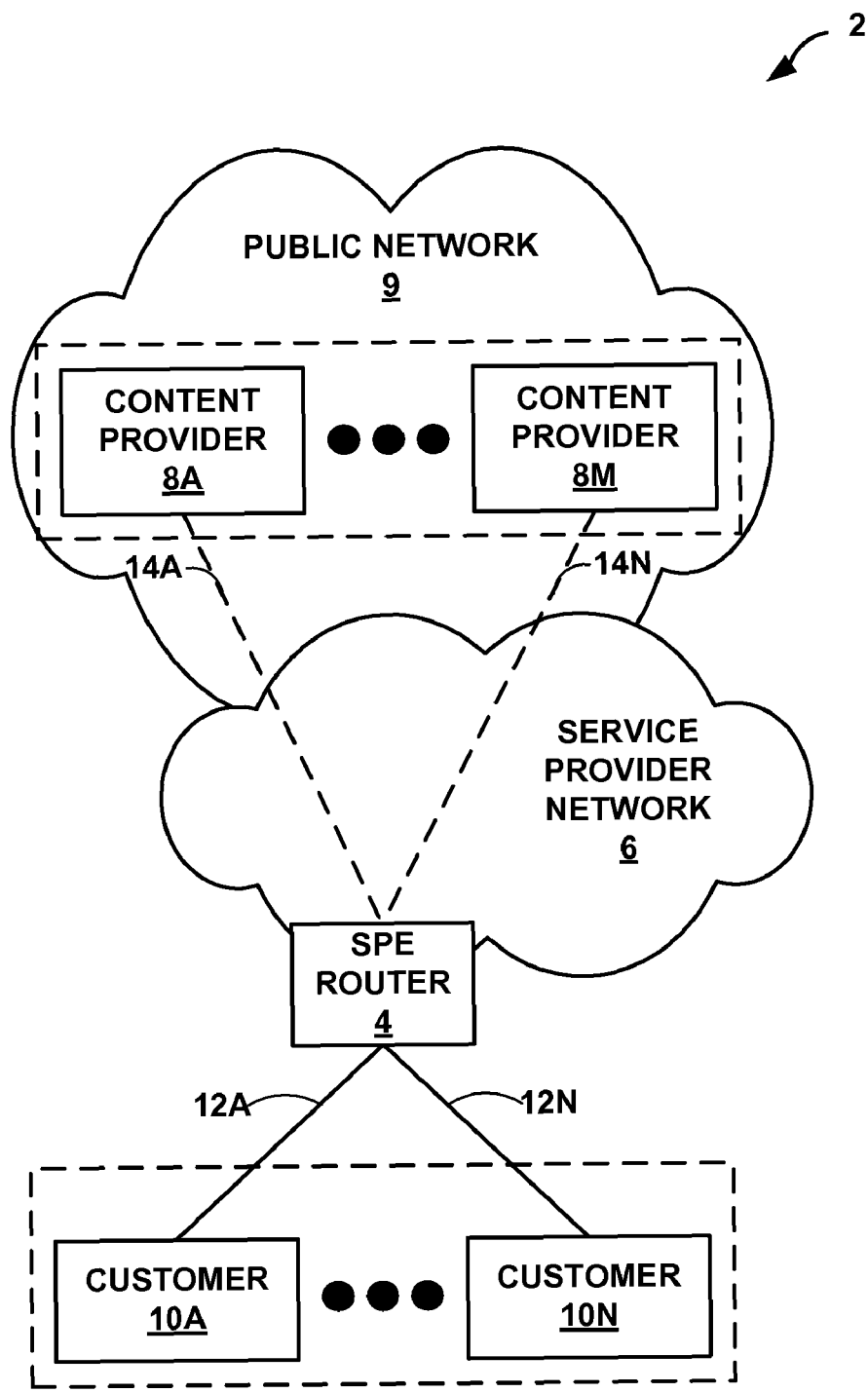
FIG. 1 is a block diagram illustrating an example system in which a service provider edge router controls multicast communication in accordance with the principles of the invention.

FIG. 1 is a block diagram illustrating an example system 2 in which a service provider edge ("SPE") router 4 controls multicast communication in a manner consistent with the principles of the invention. In the illustrated example of FIG. 1, SPE router 4 is an edge router of a service provider network 6 administered by a network service provider, and provides connectivity between content providers 8A-8M (content providers 8) and customers 10A-10N (customers 10). In particular, SPE router 4 provides customers 10 connectivity to public network 9 via links 12 and service provider network 6. Public network 9 may comprise one or more interconnected autonomous systems, and provides network-based connectivity between content providers 8 and service provider network 6. Each of content providers 8 and customers 10 may include one or more computing devices (not shown), such as personal computers, laptop computers, handheld computers, workstations, servers, switches, or other computing devices.

Service provider network 6 may be coupled to one or more networks administered by other providers, and may thus form part of a large-scale public network infrastructure, i.e., public network 9. Service provider network 6 may include a variety of network devices, such as routers, switches, servers or other devices. The configuration of system 2 illustrated in FIG. 1 is merely exemplary. For example, one or more of content providers 8 may be located within service provider network 6.

In general, content providers 8 each provide content, such as internet protocol (IP) video services, desktop conferences, corporate broadcasts, or other content to customers 10. For example, content provider 8A may provide content in the form of multicast data packets 14 to groups to which customers 10 have joined. Each multicast data packet includes a multicast address that identifies the respective multicast group. SPE router 4 maintains information associating the member customers 10 with the group, and transmits the multicast data packets 14 from content providers 8 to the member consumers.

Customers 10 interact with SPE router 4 via the Internet Group Management Protocol (IGMP) or some other multicasting protocol to issue multicast action requests. Customers 10 may, for example, issue a join or leave multicast action request to join or leave a multicast group, respectively. In the above example, customers 10 issue multicast joins to become members of the exemplary multicast groups to which SPE router 4 delivers multicast data packets 14. Customers 10 may issue multicast action requests to leave the groups, thereby terminating content delivery from SPE router 4. In similar manner, customers 10 may issue multicast action requests to SPE router 4 to switch between multicast groups, allowing customers 10 to access different content provided by content providers 8.

In addition, SPE router 4 may provide customers 10 with virtual private network (VPN) services. For instance, customer 10A may represent a remote corporate site. By providing VPN services, SPE router 4 allows customer 10A to securely exchange data with other members of the VPN. For example, customer 10A may securely exchange data with another one of customers 10 receiving VPN services from SPE router 4 or with other devices coupled to public network 9 by a different service provider network (not shown). In providing VPN services, as further described below, SPE router 4 may maintain logically isolated forwarding tables for each VPN. For example, SPE router 4 may maintain a VRF (VPN Routing and Forwarding) table for each VPN.

In accordance with the principles of the invention, SPE router 4 provides VPN members, such as customer 10A, multicast content from content providers 8 even though the content providers may be external to the VPNs maintained by the SPE router. Content provides 8 are viewed as external to the VPNs in that multicast servers (not shown) associated with the content provides have destination information (e.g., network addresses or destination prefixes) that are outside the address spaces associated with the VPNs. SPE router 4 ensures that unicast packets issued by customers 10 for initiating content delivery are forwarded outside the VPN and directed to content providers 8. In addition, SPE router 4 ensures that multicast control and data packets bypass the VRF tables associated with the VPN and seamlessly flow between customers 10 and content providers 8.

Figure 2:
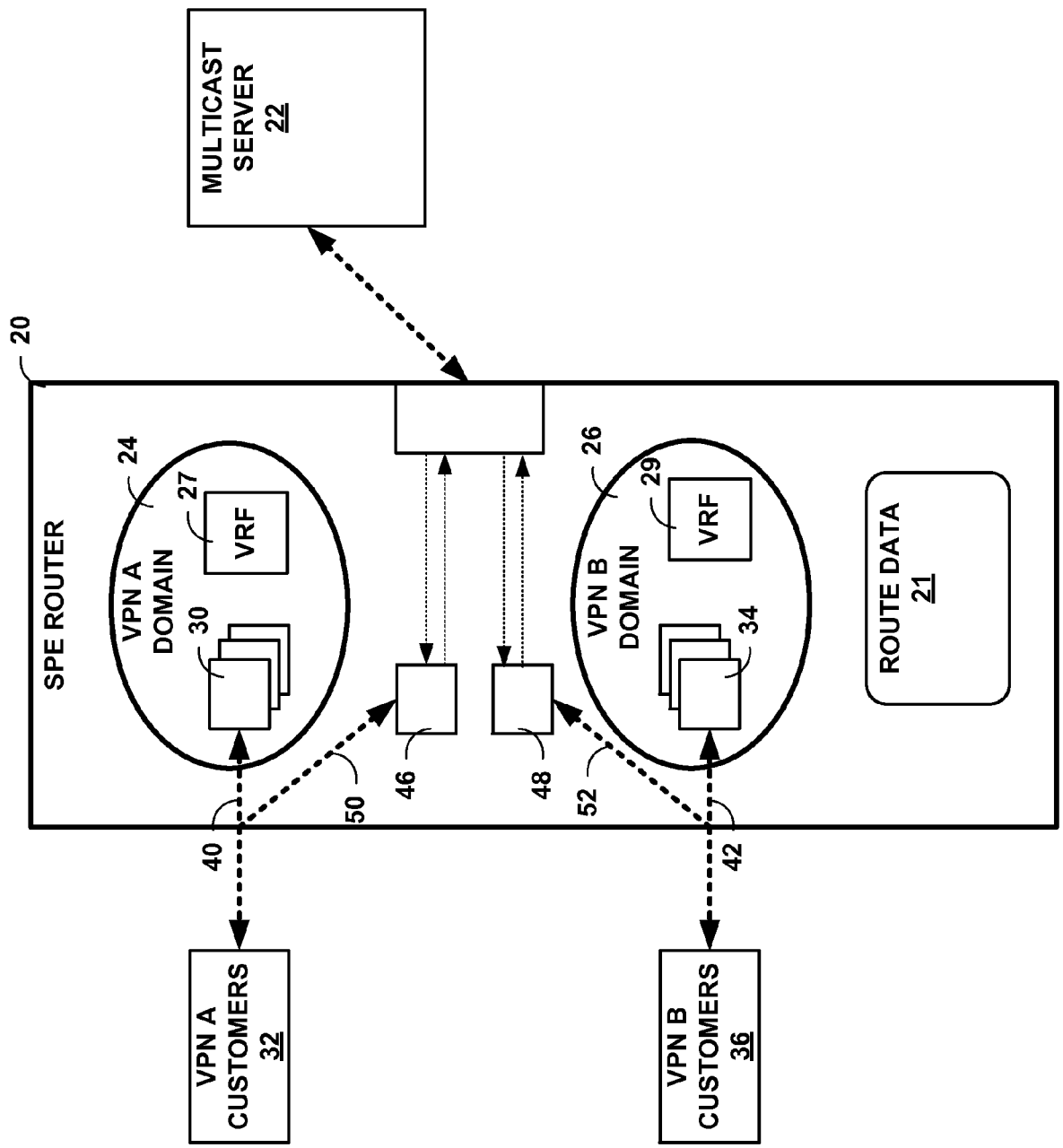
FIG. 2 is a block diagram illustrating an exemplary computing environment in further detail.

FIG. 2 is a block diagram illustrating an exemplary computing environment in further detail. In particular, FIG. 2 provides a logical illustration of an SPE router 20 controlling multicast communication in accordance with the principles of the invention.

In general, SPE router 20 receives routing information from other routing devices that describes a topology of a network environment and, in particular, routes through one or more networks within the environment (e.g., routes through service provider network 6 and public network 9 of FIG. 1). Based on the routing information, SPE router 20 generates route data 21 that describes the routes. In this fashion, route data 21 may be viewed as "global" route data in that it is not specific to a VPN. SPE router 20 may maintain route data 21 in the form of one or more tables, databases, link lists, radix trees, databases, flat files, or any other data structure.

In addition, SPE router 20 provides VPN services for two VPNs: VPN A and VPN B. In particular, SPE router 20 may be viewed as maintaining a VPN A domain 24 and a logically separate VPN B domain 26, which generally represent forwarding information and network information unique to the VPNs.

In this example, VPN A domain 24 includes a VRF table 27 that stores specific routing and forwarding information associated with VPN A. Similarly, VPN B domain 26 includes a VRF table 29 that stores specific routing and forwarding information associated with VPN B. SPE router 20 may exchange VPN-specific routing and forwarding information via any of a variety of protocols, including the Virtual Private LAN Service (VPLS), also referred to as Point-to-multipoint (P2MP) L2 VPNs.

Many conventional software multimedia players, such as the Windows Media Player from Microsoft Corporation, issue unicast packets to a content provider prior to issuing multicast action requests. To ensure proper forwarding of these unicast packets, SPE router 20 employs a routing rule that provides for "fallback routing" in the event a route lookup for VRF 27 or VRF 29 fails. For example, in the event SPE router 20 receives a unicast packet from one of VPN A customers 32 and a route lookup of VRF 27 for the packet fails, SPE router 20 automatically performs a route lookup using route data 21. This allows SPE router 20 to correctly forward unicast packets from VPN A customers 32 or VPN B customers 36 that are destined for multicast server 22 even though the routes associated with multicast server 22 may not be present within VRFs 27, 29. As a result, any unicast packets issued by VPN A customers 32 or VPN B customers 36 prior to joining a multicast session will be correctly forwarded.

In the illustrated embodiment, SPE router 20 is configured to create service-specific logical interfaces for each customer. In particular, SPE router 20 creates a respective service interface 30 for each of VPN A customers 32 upon receiving IP packets from the customers. Similarly, SPE router 20 creates a service interface 34 for each of VPN B customers 36 upon receiving Internet Protocol (IP) packets from the customers. Alternatively, services interfaces 30, 34 may be statically created in response to input from a system administrator or software agent.

Service interfaces 30, 34 represent logical interfaces associated with a respective customer (i.e., IP address), and define rules and policies for processing IP packets received from the respective customer. Upon receiving packets from VPN customers 32, 36, SPE router 20 invokes the corresponding service interfaces 30, 34 to control processing and forwarding of the packets. As a result, when processing IP traffic 40 received from VPN A customers 32, SPE router 20 generally applies service filters 30 and forwards the IP traffic in accordance with VRF 27. Similarly when processing IP traffic 42 received from VPN B customers 32, SPE router 20 applies service filters 34 and forwards the IP traffic in accordance with VRF 29.

SPE router 20 further includes multicast service interfaces 46, 48 that are specific to multicast control plane traffic originating from VPN A customers 32 and VPN B customers 36, respectively. Moreover, services interfaces 46, 48 are defined "external" to VPN A domain 24 and VPN B domain 26. SPE router 20 receives multicast packets 50 originating from VPN A customers 32, applies multicast service filter 46 and forwards the multicast traffic in accordance with route data 21, thereby bypassing VPN A domain 24 and VRF 27. Similarly, SPE router 20 receives multicast packets 52 originating from VPN B customers 36, applies multicast service filter 48 and forwards the multicast traffic in accordance with route data 21, thereby bypassing VPN B domain 26 and VRF 29.

In this manner, SPE router 20 provides seamless forwarding of multicast action requests from VPN A customers 32 and VPN B customers 36 to multicast server 22 even though multicast server 22 is external to the VPN domains. In response, multicast server 22 issues multicast packets carrying multicast content. SPE router 20 receives multicast packets from multicast server 22 and delivers the multicast packets to VPN A customers 32 and VPN B customers 36.

Figure 3:
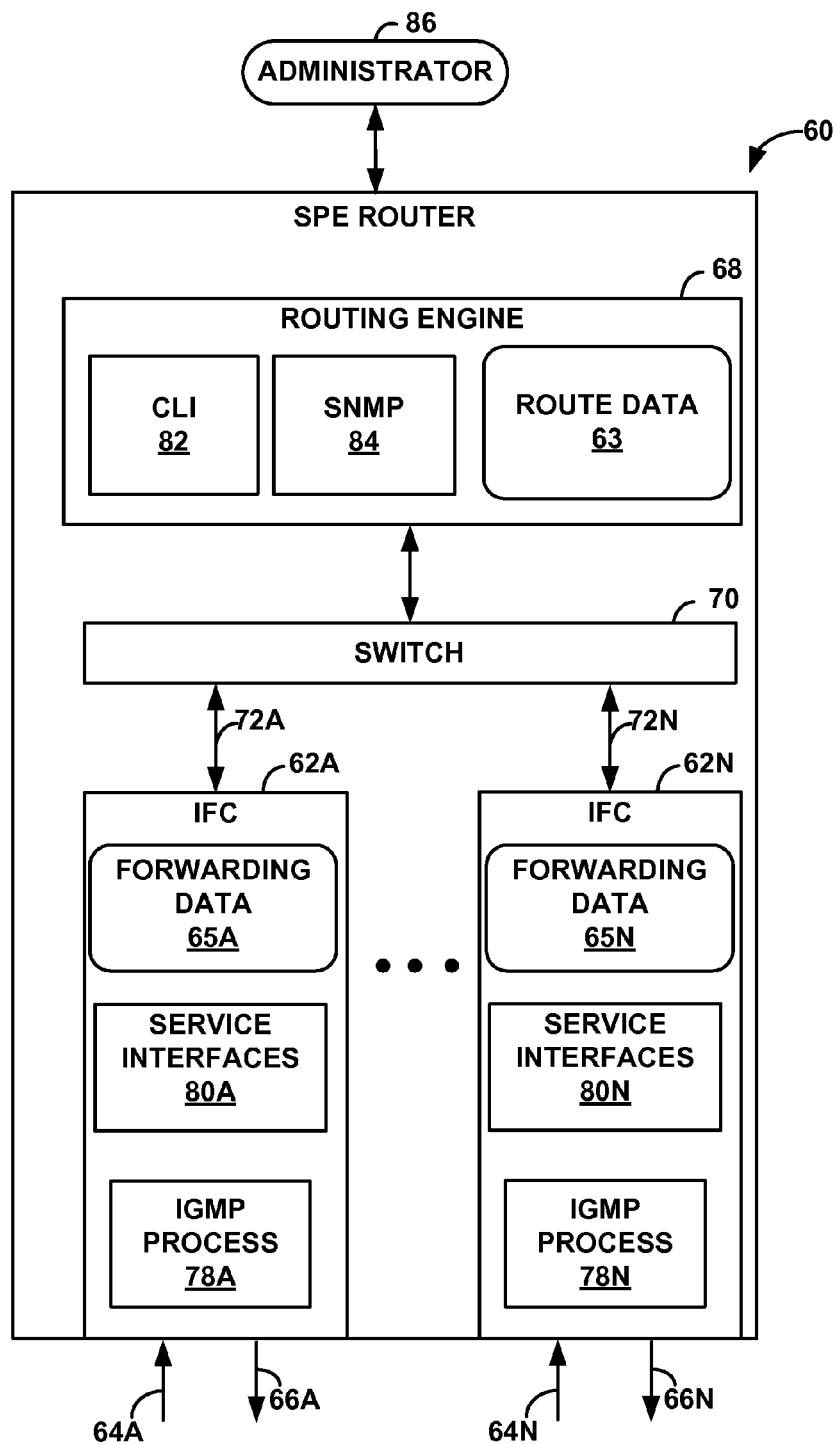
FIG. 3 is a block diagram illustrating another exemplary embodiment of a router that controls multicast communication in accordance with the principles of the invention.

FIG. 3 is a block diagram illustrating another exemplary embodiment of a router that controls multicast communication in accordance with the principles of the invention. In the exemplary embodiment of FIG. 3, SPE router 60 includes interface cards 62A-62N (IFCs 62) that receive and send packet flows via network links 64A-64N and 66A-66N, respectively. SPE router 60 may include a chassis (not shown) having a number of slots for receiving a set of cards, including IFCs 62. Each card may be inserted into a corresponding slot of the chassis for electrically coupling the card to routing engine 68 via high-speed switch 70 and internal data paths 72A-72N.

Switch 70 also provides an interconnect path between each of IFCs 62. Switch 70 may comprise, for example, switch fabric, switchgear, a configurable network switch or hub, or other high-speed switching mechanisms. Internal data paths 72 may comprise any form of communication paths, such as electrical paths within an integrated circuit, external data busses, optical links, network connections, wireless connections, or other communication paths. IFCs 62 may be coupled to network links 64A-64N and 66A-66N via a number of physical interface ports (not shown).

In general, routing engine 68 operates as a control unit for SPE router 60, and maintains route data 63 that reflects a topology of a network, e.g., service provider network 6 and public network 9 of FIG. 1. Based on route data 63, routing engine 68 generates forwarding data 65A-65N ("forwarding data 65") for IFCs 62. Each of the IFCs 62 includes a forwarding component (not shown) that forwards packets in accordance with forwarding data generated by routing engine 68. Specifically, the forwarding components of IFCs 62 determine a next hop for each inbound packet based on forwarding information 65, identify the corresponding IFCs associated with the next hop, and relay the packets to the appropriate IFCs via switch 70 and data paths 72.

Although not separately illustrated, forwarding information 65 includes "global" forwarding information (e.g., forwarding information associated with the public network) and VRFs associated with any VPNs provided by SPE router 60.

In addition, IFCs 62 execute respective IGMP processes 78A-78N (IGMP processes 78), and include service interfaces 80A-80N (service interfaces 80) for application during the forwarding process. IGMP processes 78 implement the IGMP protocol for communicating with customers regarding delivery of multicast content.

Service interfaces 80 include logical service interfaces for each customer. In particular, service interface 80 may include a set of service interfaces associated with each VPN domain maintained by SPE router. In addition, as described above, service interfaces 80 include multicast service interfaces that are specifically applied to multicast control plane traffic originating from VPN customers. Specifically, as describe herein, upon receiving multicast packets originating from VPN customers, IFC 62 may apply the multicast service filters and forward the multicast traffic in accordance with the global portion of forwarding data 65, thereby bypassing any private VRFs associated with the VPNs to which the originating customers belong.

Routing engine 68 may provide a command line interface (CLI) 82 and the Simple Network Management Protocol (SNMP) 84 for configuring SPE router 60, including installing the multicast service interfaces. CLI 82 allows a user, such as administrator 86, to interact with SPE router 60 by entering commands in accordance with a pre-defined syntax. SNMP 84 provides general support for communication with a remote user or agent for management and configuration of SPE router 60.

The embodiment of SPE router 60 shown in FIG. 3 is illustrated for exemplary purposes. Alternatively, SPE router 60 may have a centralized control unit having a routing engine and a forwarding engine. In this embodiment, forwarding functionality is not distributed to IFCs 62, but centralized within the forwarding engine. Moreover, the principles of the invention can be realized within a layer three switch or other device. However, for ease of illustration, the principles of the invention are illustrated in the context of SPE router 60.

In general, the processes described above, including delivery of multicast content as described, may be implemented as executable instructions fetched from one or more computer-readable media. Examples of such media include random access memory (RAM), read-only memory (ROM), non-volatile random access memory (NVRAM), electrically erasable programmable read-only memory (EEPROM), flash memory, and the like. Moreover, the functions of the processes may be implemented by executing the instructions of the computer-readable medium with one or more processors, discrete hardware circuitry, firmware, software executing on a programmable processor, or a combination of any of the above.

Figure 4:
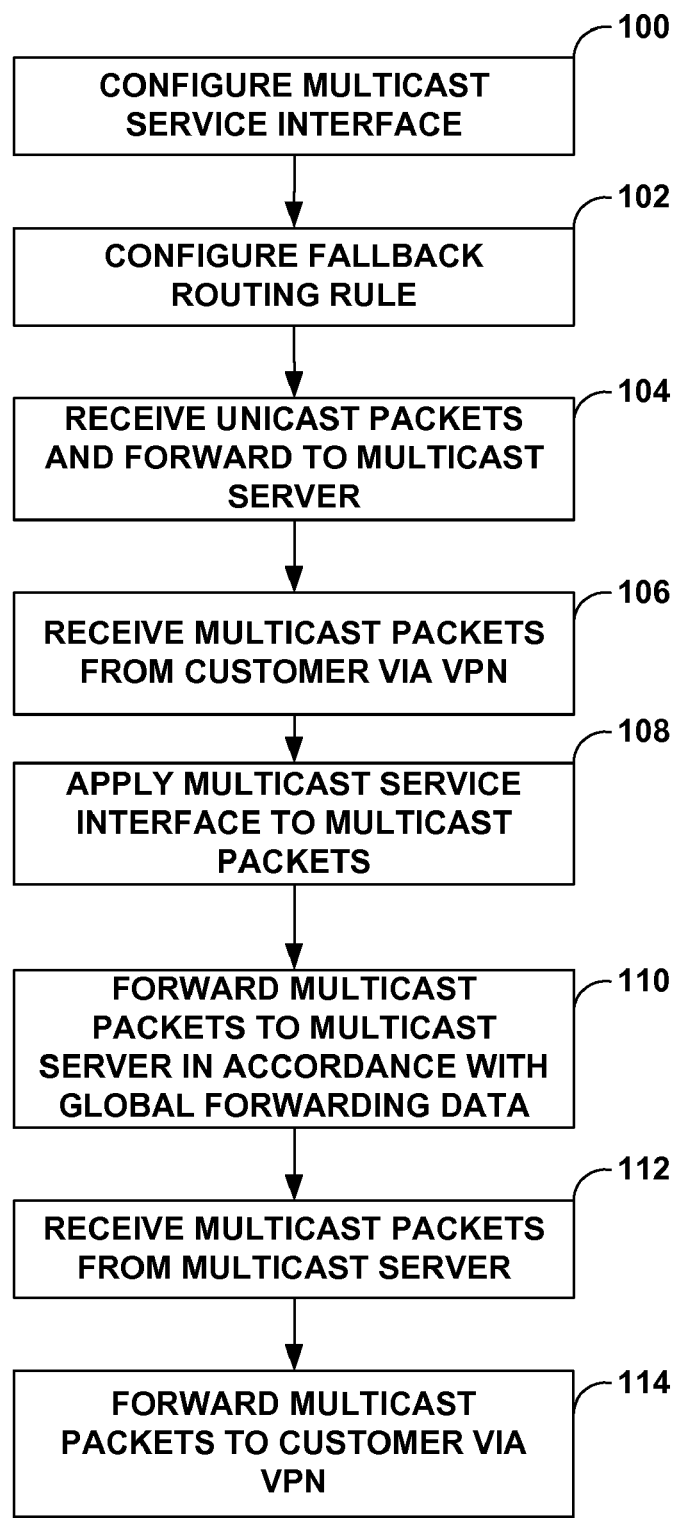
FIG. 4 is a flowchart illustrating example operation of the router of FIG. 3.

FIG. 4 is a flowchart illustrating an example operation of a router in controlling multicast communication in accordance with the principles of the invention. For purposes of illustration, the flowchart of FIG. 4 is described in reference to SPE router 60 of FIG. 3.

Initially, SPE router 60 enables IP service interfaces generally, and configures one or more multicast service interfaces (100). In particular, routing engine 68 of SPE router 60 may receive commands from administrator 86 or a software agent via CLI 82 or SNMP 84. In response to the commands, routing engine 68 installs a multicast service interface for each customer VPN. Routing engine 68 defines the multicast service interface external to the customer VPN (i.e., external to the associated VPN domain), and programmatically installs the multicast service interface on one or more of IFCs 62 that may receive multicast action requests from the VPN customers. Alternatively, routing engine 68 may install the multicast service interface dynamically upon receiving multicast packets from the VPN customers.

Next, routing engine 68 configures a routing rule enabling "fallback routing" (102). The routing rule specifies that "global" routes within forwarding data 65 will be used in the event a packet is received from a customer VPN and a route lookup on the respective VRF fails. Routing engine 68 installs the routing rule within one or more of IFCs 62 that may receive unicast packets from multimedia software executed by VPN customers. Again, routing engine 68 may define the rule in response to commands received via CLI 82 or SNMP 84, or dynamically upon receiving a multicast packet from a VPN customer.

Once configured, SPE router 60 may receive unicast packets from VPN customers (e.g., unicast packets issued by multimedia player software executing on the customer machines) and forward the unicast packets to a content provider (104). For example, a receiving one of IFCs 62 may receive a unicast packet from a VPN customer, and attempt to forward the packet in accordance with an associated VRF. Because the destination of the unicast packet (i.e., the content provider) is external to the VPN, route lookup fails and the receiving IFC 62 invokes fallback routing. As a result, the receiving IFC 62 performs a route lookup on the global portion of forwarding data 65, resolves the destinations to a next hop, and forwards the unicast packet.

Next, SPE router 60 receives one or more multicast action requests from a VPN customer in the form of multicast packets (106). Specifically, a receiving one of IFCs 62 receives the multicast packets from customers via links 64. Upon receiving the multicast packets, the receiving IFC 62 applies the multicast service interface and IGMP process 78, which is enabled on the multicast service interface, to process the multicast packets (108). In one embodiment, the multicast service interface applies a rule to demultiplex multicast packets received from VPN customers, and allows the multicast packets to be received on the multicast service interface in the global domain (i.e., external to the VPN domain).

The receiving IFC 62 forwards the demultiplexed multicast packets to the specified destination (i.e., multicast server) in accordance with the global portion of forwarding data 65 (110). In this manner, multicast action requests such as group joins are correctly forwarded to the content providers even though the content providers may be external to the VPN.

Next, SPE router 60 may receive a stream of multicast packets from the content provider in response to the multicast action requests (112). IFCs 62 receive the multicast packets from the content provider and forward the multicast packets to the VPN customers (114).

Various embodiments of the invention have been described. Although described in reference to multicast delivery, the techniques may be utilized to provide other services to VPN customers from non-VPN sources. For example, the techniques may be utilized to provide VPN customers with voice over Internet Protocol (VoIP) services, address translation services, DHCP services, authentication and encryption services and other network services.

Moreover, although the techniques have been described with respect to a service provider router, other devices may employ the techniques described herein. For example, the techniques may be applied by an enterprise router, a core router, a layer three switch or intelligent hub or other device, or combinations thereof.

The invention claimed is:

1. A method comprising:
    maintaining, within a network device, a first set of forwarding data for a virtual private network and a second set of forwarding data;
    defining, within the network device, a logical service interface to associate multicast packets received from the virtual private network with the second set of forwarding data;
    receiving, with the network device, a multicast packet from the virtual private network, wherein the multicast packet includes destination information for a multicast content provider external to the virtual private network;
    associating the multicast packet with the logical service interface; and
    forwarding the multicast packet to the multicast content provider in accordance with the logical service interface, wherein forwarding the multicast packet comprises bypassing, within the network device, the first set of forwarding data upon receiving the multicast packet and forwarding the multicast packet in accordance with the second set of forwarding data.

2. The method of claim 1, wherein the second set of forwarding data is associated with a public network.

3. The method of claim 1, wherein the second set of forwarding data is associated with a second virtual private network.

4. The method of claim 1, further comprising:
    specifying a routing rule to employ a route lookup using the second set of forwarding data when a route lookup using the first set of forwarding data fails;
    receiving a unicast packet from a customer associated with the virtual private network and destined for the multicast content provider; and
    forwarding the unicast packet in accordance with the second set of forwarding data when a route lookup for the unicast packet using the first set of forwarding data fails.

5. The method of claim 1, further comprising defining the logical service interface in response to commands received from an administrator or software agent.

6. The method of claim 1, further comprising dynamically defining the logical service interface.

7. The method of claim 1,
wherein receiving a multicast packet comprises receiving the multicast packet via an inbound link of an interface card of a router, and
wherein forwarding the multicast packet comprises forwarding the multicast packet via an outbound link of an interface card of the router.

8. The method of claim 1, wherein receiving a multicast packet comprises receiving the multicast packet in accordance with a multicast protocol.

9. The method of claim 8, wherein the multicast protocol comprises the Internet Group Management Protocol (IGMP) protocol.

10. The method of claim 1, wherein the multicast packet is associated with a multicast action request issued by a customer belonging to the virtual private network.

11. The method of claim 1, further comprising installing the logical service interface within an interface card of a router.

12. The method of claim 1,
wherein the multicast packet comprises one of a plurality of multicast packets received from the virtual private network, and
wherein forwarding the multicast packet comprises applying a forwarding rule to demultiplex the multicast packets and process the multicast packets within a router in accordance with a domain external to the virtual private network.

13. The method of claim 1, further comprising:
receiving multicast packets from the content provider; and
forwarding the multicast packets to a customer associated with the virtual private network.

14. The method of claim 13, wherein the multicast packets from the content provider are associated with an audio or video stream, a Voice over Internet Protocol (VoIP) service, a DHCP service, a network conference or a web cast.

15. A network device comprising:
a forwarding component to maintain a first set of forwarding data for a virtual private network and a second set of forwarding data;
an interface card to receive a multicast packet from the virtual private network, wherein the multicast packet includes destination information for a multicast content provider external to the virtual private network; and
a logical service interface to associate the multicast packet with the second set of forwarding data,
wherein the forwarding component associates the multicast packet with the logical service interface, and
wherein the forwarding component bypasses the first set of forwarding data and forwards the multicast packet to the multicast content provider in accordance with the second set of forwarding data.

16. The network device of claim 15, wherein the second set of forwarding data is associated with a public network.

17. The network device of claim 15, wherein the second set of forwarding data is associated with a second virtual private network.

18. The network device of claim 15, wherein the forwarding component employs a route lookup using the second set of forwarding data when a route lookup using the first set of forwarding data fails.

19. The network device of claim 18,
wherein the interface card receives a unicast packet from the virtual private network, wherein the unicast packet includes destination information for the multicast content provider, and
wherein the forwarding component forwards the unicast packet in accordance with the second set of forwarding data when a route lookup for the unicast packet using the first set of forwarding data fails.

20. The network device of claim 15, wherein the forwarding component applies a forwarding rule to demultiplex the multicast packet and process the multicast packets in accordance with a domain external to the virtual private network.

21. The network device of claim 15, further comprising a routing engine to maintain routing data for a topology of the virtual private network and a second network associated with the second set of forwarding data.

22. The network device of claim 15, further comprising an interface to receive commands, wherein the routing engine generates the logical service interface that associates the multicast packet with the second set of forwarding data in response to the commands.

23. The network device of claim 15, further comprising a multicast protocol executing on the interface card for receiving the multicast packet.

24. The network device of claim 23, wherein the multicast protocol comprises the Internet Group Management Protocol (IGMP) protocol.

25. The network device of claim 15, wherein the multicast packet is associated with a multicast action request issued by a customer belonging to the virtual private network.

26. The network device of claim 15, wherein the network device comprises a router or a layer three switch.

27. The network device of claim of 15, wherein the interface card includes the forwarding component.

28. The network device of claim 15, wherein the network device comprises a service edge router, an enterprise router or a core router.

29. A non-transitory computer-readable medium comprising instructions capable of being executed by a computer to:
maintain a first set of forwarding data for a virtual private network and a second set of forwarding data;
define, within a network device, a logical service interface to associate multicast packets received from the virtual private network with the second set of forwarding data;
receive, with the network device, a multicast packet from the virtual private network, wherein the multicast packet includes destination information for a multicast content provider external to the virtual private network;
associate the multicast packet with the logical service interface; and
forward the multicast packet to the multicast content provider in accordance with the logical service interface, wherein forwarding the multicast packet comprises bypassing, within the network device, the first set of forwarding data upon receiving the multicast packet and forwarding the multicast packet in accordance with the second set of forwarding data.

* * * * *